United States Patent
Chung

(10) Patent No.: US 7,463,348 B2
(45) Date of Patent: Dec. 9, 2008

(54) RAIL VEHICLE MOUNTED RAIL MEASUREMENT SYSTEM

(75) Inventor: Wing Yeung Chung, Erie, PA (US)

(73) Assignee: General Electric Company, Schenectady, NY (US)

( * ) Notice: Subject to any disclaimer, the term of this patent is extended or adjusted under 35 U.S.C. 154(b) by 14 days.

(21) Appl. No.: 11/456,312

(22) Filed: Jul. 10, 2006

(65) Prior Publication Data
US 2008/0007724 A1    Jan. 10, 2008

(51) Int. Cl.
*G01N 21/00* (2006.01)
(52) U.S. Cl. .................. 356/237.1; 356/237.2
(58) Field of Classification Search ........... None
See application file for complete search history.

(56) References Cited

U.S. PATENT DOCUMENTS

| | | | |
|---|---|---|---|
| 3,505,742 A | 4/1970 | Fiechter | |
| 3,864,039 A * | 2/1975 | Wilmarth | 356/625 |
| 4,259,018 A | 3/1981 | Poirier | |
| 4,490,038 A | 12/1984 | Theurer et al. | |
| 4,654,973 A | 4/1987 | Worthy | |
| 4,915,504 A | 4/1990 | Thurston | |
| 5,203,089 A | 4/1993 | Trefouel et al. | |
| 6,356,299 B1 | 3/2002 | Trosino et al. | |
| 6,600,999 B2 | 7/2003 | Clark et al. | |
| 6,647,891 B2 * | 11/2003 | Holmes et al. | 104/2 |
| 6,995,556 B2 | 2/2006 | Nejikovsky et al. | |
| 2003/0142297 A1 * | 7/2003 | Casagrande | 356/237.2 |
| 2006/0017911 A1 * | 1/2006 | Villar et al. | 356/4.01 |

FOREIGN PATENT DOCUMENTS

EP    0378781    7/1990

* cited by examiner

*Primary Examiner*—Michael P Stafira
(74) *Attorney, Agent, or Firm*—Robert Wawrzyn, Esq.; Terry M. Sanks, Esq.; Buesse Wolter Sanks Mora & Maire, P.A.

(57) ABSTRACT

A rail measurement system (10) for mounting on a rail vehicle (e.g., 12) for travel over a railway (16) having two spaced apart rails (18, 19) includes a first collimated light source (20) mounted on the rail vehicle for providing a first reference marker (22) relative to a first rail of the railway. The system includes a camera (28) mounted on the rail vehicle for recording an image of the reference marker relative to the first rail. The system also includes an image processor (50) coupled to the camera for analyzing the image of the reference marker relative to the first rail to determine a first rail alignment dimension (e.g., 39) with respect to the reference marker.

24 Claims, 2 Drawing Sheets

RAIL VEHICLE MOUNTED RAIL MEASUREMENT SYSTEM

FIELD OF THE INVENTION

This invention relates to inspection of railway rails, and, more particularly, to a rail vehicle mounted rail measurement system.

BACKGROUND OF THE INVENTION

Fixed rail transportation systems that include one or more a rail vehicles traveling over spaced apart rails of a railway track have been an efficient way of moving cargo and people from one geographical location to another. In densely populated countries and countries having a unimproved road transportation systems, rail vehicles may be the primary means for moving people and cargo. Accordingly, there are probably millions of miles of railroad track throughout the world that need to be maintained to provide safe rail transportation. These railroad tracks need to be routinely inspected to identify problems that may be indicative of incipient track failures. Such track failures may occur as a result of soil and ballast displacement, deterioration of ties supporting the rails, and/or loosening of rail attachment members that may result in track misalignment.

Accordingly, there is a continuing need to improve railway track inspection means. In particular, it is important to ensure that a distance between rails of a railway track, or the rail gage of the track, remain within predetermined ranges such as may be specified by FRA requirements. The gage of a pair of rails is defined by the FRA as the distance between the rails measured at a point five eights of an inch below a top surface of the rail head. Standard U.S. rail gage is specified by the FRA as 56.5 inches. For a U.S. standard gage track, the gage cannot be permitted to spread to more than one inch and a quarter from the U.S. standard gage distance of 56.5 inches.

The most primitive technique for track inspection is to perform a visual inspection of the track to assess track condition. Such an inspection typically involves track inspection personnel walking along or riding adjacent to a track to look for potential track anomalies indicative of potential track failure. This technique may involve the use of various mechanical measuring devices designed to assist the inspection personnel in making track measurements, such as manually measuring a rail gage of the track. However, these manual techniques are time consuming and labor intensive.

Various mechanical rail gage measurement systems have been proposed, but such systems may be susceptible to foreign debris on the rails and still may be too time consuming and may require auxiliary equipment to operate the measurement system. More recently, optical and electromagnetic methods have been proposed to measure rail alignment. Such systems typically rely on sophisticated and expensive electronic hardware for determining rail alignment.

BRIEF DESCRIPTION OF THE INVENTION

The present invention is directed to a system and method for measuring rail dimensions of a railway using rail vehicle mounted equipment. In an embodiment, a rail measurement system for mounting on a rail vehicle for travel over a railway having two spaced apart rails includes a first collimated light source mounted on a rail vehicle for providing a first reference marker relative to a first rail of a railway. The system also includes a camera mounted on the rail vehicle for recording an image of the reference marker relative to the first rail. The system further includes an image processor coupled to the camera for analyzing the image of the reference marker relative to the first rail to determine a first rail alignment dimension with respect to the reference marker.

In another embodiment, a rail measurement system for mounting on a rail vehicle includes a first collimated light source mounted on a rail vehicle providing a first reference marker relative to a first rail of a railway and a second collimated light source mounted on a rail vehicle and spaced apart from the first collimated light source for providing a second reference marker relative to a second rail of the railway. The system also includes a camera mounted on the rail vehicle for recording an image of the first and second reference markers relative to respective first and second rails and an image processor coupled to the camera for analyzing the image of the first and second reference markers relative to respective first and second rails to determine a rail alignment dimension corresponding to the first and second reference markers relative to respective first and second rails and a spacing between the markers.

In another embodiment, a method for measuring a rail alignment of spaced apart rails of a railway from a rail vehicle for travel over the railway includes using a first collimated light source for providing a first reference marker relative to a first rail of a railway. The method also includes capturing an image of the first reference marker relative to a first rail of a railway and processing the image to determine a first rail alignment dimension with respect to the first reference marker.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Image acquisition and digitizing systems have been used on locomotives to record images acquired by cameras mounted on the locomotives. Recent advances in image processing have greatly improved the ability to process images acquired by locomotive on-board digitizing systems to extract information in near real-time. However, it has proven difficult to use an onboard camera system to image the track and perform track alignment measurements. The inventors of the present invention have innovatively realized that by providing a measurement reference marker viewable by a camera oriented for inspecting rails of a railway track, rail dimensions, such as rail gage, may be readily determined using image processing techniques on images of the measurement reference marker in relation to a rail being imaged.

Figure 1:
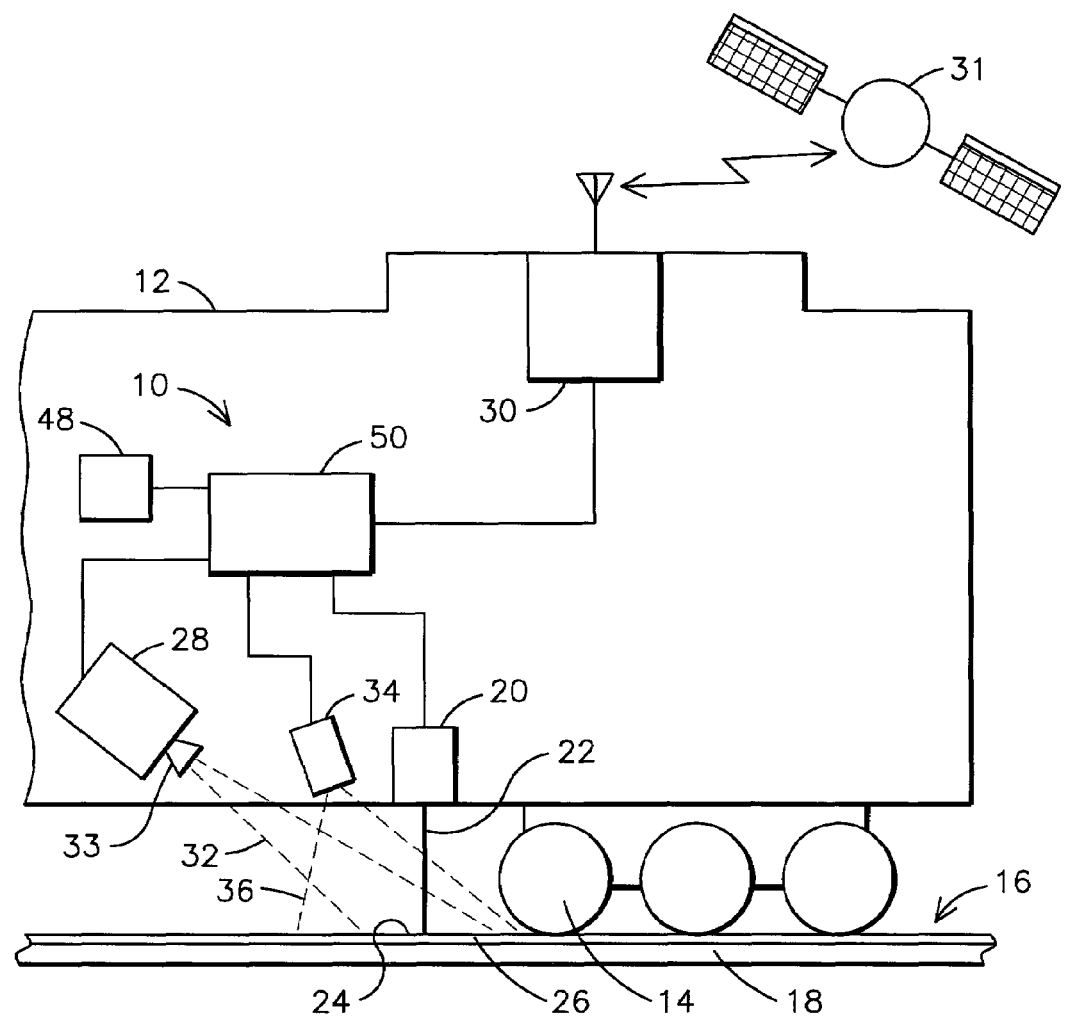
FIG. 1 is schematic side view of an example rail measurement system for mounting on a rail vehicle for travel over a railway.

FIG. 1 is schematic side view of an example rail measurement system 10 for mounting on a rail vehicle for travel over a railway 16. In an aspect of the invention, the system 10 is mounted on a locomotive 12 proximate a wheel 14 of the locomotive 14 for performing rail dimension measurements on a portion of the railway rail 18 proximate where the wheel is applying force to the rail 18. It is believed that a rail measurement dimension made proximate a wheel 14 better reflects a condition of an alignment of the rail 18 when the locomotive 12 is traveling over the rail 18. For example, under the weight of the locomotive 12, the rails of the railway 16 may be slightly forced apart compared to an unloaded rail condition. Consequently, a rail measurement made on unloaded rails may result in a measurement being within a predetermined gage dimension range, but the same rails may not be within the predetermined gage dimension range due to spreading when the rails are loaded.

In an embodiment of the invention, the system 10 may include a first collimated light source 20 mounted on the locomotive 12 for providing a first reference marker 22 relative to a first rail 18 of the railway 16. For example, the collimated light source 20 may include a laser producing a collimated light beam forming the first reference marker 22. The laser may be aimed at a top 24 of the railhead 26 of the rail 18 so that the collimated light beam shines substantially perpendicularly from the locomotive 12 to the railhead top 24.

The system 10 may also include a camera 28 mounted on the locomotive 12 for recording an image of the reference marker 22 relative to the first rail 18. In an aspect of the invention, the camera 28 may be configured for imaging in a frequency range overlapping with a frequency range of the collimated light source 20 used to produce the reference marker 22. For example, the camera 28 may sense visible light produced by a visible light producing laser, or may sense infrared light generated by an infrared light producing laser. The camera 28 may be positioned on the locomotive 12 at a suitable location for imaging in the vicinity of the rail 18 and the reference marker 22, as shown by the dotted line field of view indication 32. A zoom lens 29 may be provided to achieve a sufficient field of view and resolution needed to image the reference marker 22 and rail 18. In another aspect of the invention, an illumination source 34, such as an incandescent, fluorescent, or light emitting diode (LED), may be provided to illuminate an area, indicated, for example, by dotted line indication 36, being imaged by the camera 28 during low light and/or night time conditions.

In a further aspect of the invention, the camera 28 is in communication with an image processor 50 receiving an image of the reference marker 22 relative to the rail 18. In an embodiment of the invention, the image processor 50 may be a component of an existing video capture system conventionally used on locomotives to record track images in the vicinity of the locomotive 12. The image processor 50 may be configured for analyzing the image of the reference marker 22 relative to the rail 18 to determine a first rail alignment dimension with respect to the reference marker 22. For example, the image processor 50 may be configured for measuring spatial dimensions between the reference marker 22 and features of the imaged rail 18 and for comparing such measurement dimensions to predetermined dimension ranges to determine if the measured dimensions are within the predetermined dimension ranges. In another embodiment, the image processor 50 may be configured for measuring rail wear, such as by measuring features of the imaged rail 18 with respect to the reference marker 22 to determine if the features are worn beyond an allowable dimension.

In an embodiment of the invention, the image processor 50 may be in communication with a locomotive locating system, such as a global positioning system (GPS) 30 in communication with a GPS satellite 31 for determining a location of the locomotive 12. The image processor 50 may tag the images received from the camera 28 with a location of the locomotive 12 when the images are captured so that rail measurements may be correlated to location. In another aspect, the locomotive information may be used to modify predetermined dimension ranges used by the image processor 50 to determine whether a measured dimension is within a predetermined dimension range. For example, based on a sensed location of the locomotive 12 relative to a track geometry database stored, for example, in memory 48, the system 10 may identify a type of track geometry being measured, such as a curved section of track, that may require modification of the predetermined dimension ranges from predetermined dimension ranges used for assessing straight track sections. In another aspect of the invention, the image processor 50 may be in communication with the collimated light source 20 and the illumination light source 34, respectively, for controlling their functions, such as to increase and/or decrease their respective light intensities.

Figure 2:
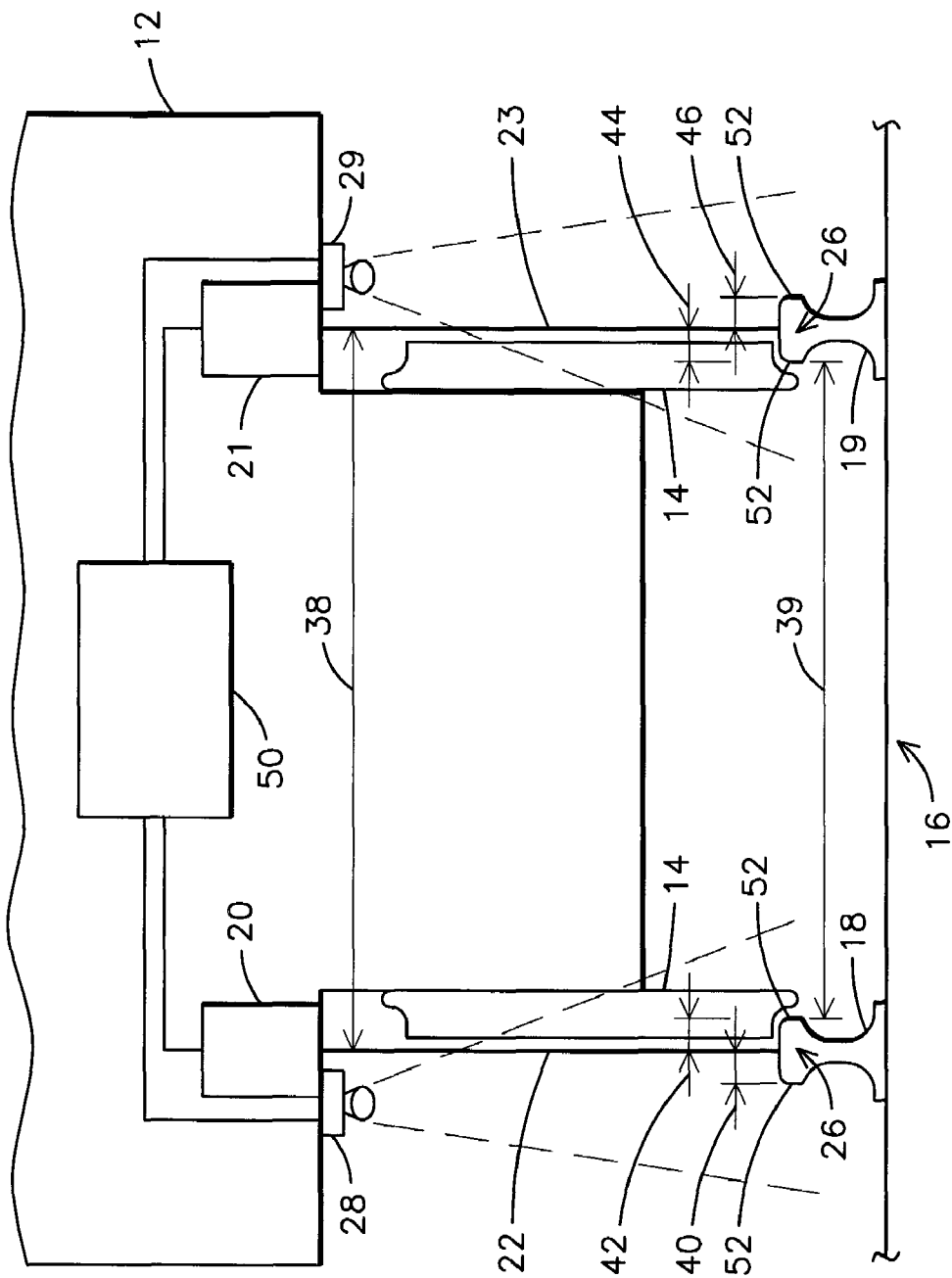
FIG. 2 is schematic cross sectional view of an example rail measurement system for mounting on a rail vehicle for travel over a railway.

In an embodiment of the invention shown in the schematic cross sectional view FIG. 2, the system 10 may be configured for measuring a rail gage of a railway track over which the locomotive 12 is traveling. The system 10 may include the first collimated light source 20 being mounted on one side of a rail vehicle, such as locomotive 12, for providing a first reference marker 22 relative to a first rail 18 of the railway 16. At an opposite of the locomotive 12, a second collimated light source 21, spaced apart from the first collimated light source, may provide a second reference marker 23 relative to a second rail 19 of the railway 16. The first and second collimated light sources 20, 21 may be spaced apart to generate respective reference markers 22, 23 being spaced apart a distance 38 about the width of the rail gage 39 being measured. In an aspect of the invention, the collimated light sources 20, 21 may be adjustable to move the reference markers 22, 23 to achieve a desired alignment relative to the respective rails 18, 19. The collimated light sources 20, 21 may be positioned so that the reference markers 22, 23 impinge on respective tops 24 of the railheads 26 and extend substantially perpendicularly with respect to the tops 24 of the railheads 26.

A camera, e.g. 28, may be mounted on the rail vehicle for recording an image of the first and second reference markers 22, 23 relative to respective first and second rails 18, 19. A single camera may be used provided it has sufficient field of view and resolution to capture images of both rails 18, 19 and markers 22, 23. In the example embodiment shown in FIG. 2, two cameras 28, 29 may be separately used to image respective rails 18, 19 and markers 22, 23. An image processor 50 may be coupled to the cameras 28, 29 for analyzing respective images of the first and second reference markers 22, 23 relative to respective first and second rails 18, 19. The image processor 50 may be configured to determine a rail alignment dimension corresponding to a spatial relationship between first and second reference markers 22, 23 and respective first and second rails 18, 19 and a spacing between the first and second markers 22, 23. For example, the image processor 50 may be configured for analyzing captured images to determine marker 22, 23 to rail feature dimensions, such as laser beam to rail head edge dimensions 40, 42, 44, 46 as shown in FIG. 2.

The inventors of the present invention have innovatively determined that rail head edges 52 provide relatively high contrast for image analysis compared to other features of the rail 18. By determining the marker 22, 23 to rail head dimensions 40, 42, 44, 46 and by using the distance 38 between the markers 22, 23, a measured rail dimension, such as a measured rail gage 39, may be calculated. The image processor 50 may be further configured for comparing the measured rail dimensions to a predetermined dimension range to determine if the measured rail dimension is within the predetermined dimension range. If the rail dimension is outside of the predetermined dimension range, the location of the rail 18, 19 may be tagged by the image processor 50 using, for example, the locomotive's GPS location.

Based on the foregoing specification, the invention may be implemented using computer programming or engineering techniques including computer software, firmware, hardware or any combination or subset thereof, wherein the technical effect is to provide a rail vehicle mounted rail measurement system. Any such resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system embodying the method of the invention. An apparatus for making, using or selling the invention may be one or more processing systems including, but not limited to, a central processing unit (CPU), memory, storage devices, communication links and devices, servers, I/O devices, or any sub-components of one or more processing systems, including software, firmware, hardware or any combination or subset thereof, which embody the invention.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

What is claimed is:

1. A rail measurement system for mounting on a rail vehicle for travel over a railway having two spaced apart rails, the system comprising:
   a first collimated light source mounted on a rail vehicle for providing a first reference marker relative to a top of a railhead of a first rail of a railway;
   a first camera mounted on the rail vehicle for recording an image of the reference marker relative to the top of the railhead of the first rail; and
   an image processor coupled to the camera for analyzing the image of the reference marker relative to the top of the railhead of the first rail to determine a first rail alignment dimension of the top of the railhead with respect to the reference marker.

2. The system of claim 1, further comprising a second collimated light source mounted on the rail vehicle spaced apart from the first source for providing a second reference marker relative to a top of a railhead of a second rail of the railway.

3. The system of claim 2, wherein the first camera and a second camera are configured for recording respective images of the first and second reference markers relative to the respective top of the railhead of the first and second rails.

4. The system of claim 2, wherein the image processor is configured for analyzing the images of the first and second reference markers relative to the respective top of the railhead of the first and second rails to determine a second rail alignment dimension corresponding to the first and second reference markers relative to the respective top of the railhead of the first and second rails and a spacing between the first and second markers.

5. The system of claim 2, further comprising a second camera for recording a second image of the second reference marker relative to the top of the railhead of the second rail and providing the second image to the image processor.

6. The system of claim 1, further comprising a locator providing location information to the image processor for correlating rail alignment dimensions with location of a railway portion being imaged.

7. The system of claim 1, further comprising an illumination source for illuminating an area proximate the top of the railhead of the first rail being imaged by the first camera.

8. The system of claim 1, wherein the rail vehicle comprises a locomotive.

9. The system of claim 1, wherein the collimated light source comprises a laser.

10. The system of claim 1, wherein the image processor is further configured for analyzing the image of the first reference marker relative to the top of the railhead of the first rail to determine when the first rail is worn beyond an allowable dimension.

11. A rail measurement system for mounting on a rail vehicle for travel over a railway having spaced apart rails, the system comprising:
    a first collimated light source mounted on a rail vehicle providing a first reference marker relative to a top of a railhead of a first rail of a railway;
    a second collimated light source mounted on a rail vehicle and spaced apart from the first collimated light source for providing a second reference marker relative to a top of a railhead of a second rail of the railway; and
    a pair of cameras mounted on the rail vehicle for recording a respective image of the first and second reference markers relative to the respective top of the railhead of the first and second rails;
    an image processor coupled to the pair of cameras for analyzing the image of the first and second reference markers relative to the respective top of the railhead of the first and second rails to determine a rail alignment dimension corresponding to the first and second reference markers relative to the respective top of the railhead of the first and second rails and a spacing between the markers.

12. The system of claim 11, wherein a first camera of the pair of cameras is for recording a first image of the first reference marker relative to the first rail and a second camera of the pair of cameras is for recording a second image of the second reference marker relative to the second rail.

13. The system of claim 11, wherein the rail alignment dimension comprises a rail gage.

14. A method for measuring a rail alignment of spaced apart rails of a railway from a rail vehicle for travel over the railway, the method comprising:
    using a first collimated light source for providing a first reference marker relative to a top of a railhead of a first rail of a railway;
    capturing an image of the first reference marker relative to the top of the railhead of the first rail of the railway; and
    processing the image to determine a first rail alignment dimension of the top of the railhead with respect to the first reference marker.

15. The method of claim 14, further comprising using a second collimated light source spaced apart from the first source for providing a second reference marker relative to a top of a railhead of a second rail of the railway.

16. The method of claim 15, further comprising capturing an image of the second reference marker relative to the top of the railhead of the second rail of the railway.

17. The method of claim 16, further comprising processing the image of the second reference marker to determine a second rail alignment dimension with respect to the second reference marker.

18. The method of claim 17, determining a third rail alignment dimension with respect to the first rail alignment, the second rail alignment and distance between the first and second markers.

19. The method of claim 14, wherein processing the image to determine the first rail alignment dimension comprises determining a distance between the first reference marker and a feature of the first rail.

20. The method of claim 18, further comprising determining when the third dimension exceeds a predetermined alignment dimension range.

21. The method of claim 20, further comprising adjusting the predetermined alignment dimension range responsive to track geometry.

22. The method of claim 21, wherein the track geometry is determined responsive to a sensed location of the rail vehicle.

23. The method of claim 22, wherein the location of the rail vehicle is sensed using a GPS system.

24. The method of claim 14, wherein processing the image further comprises analyzing the image to determine when the top of the railhead of the first rail is worn beyond an allowable dimension.

* * * * *